United States Patent
Ishii et al.

(10) Patent No.: US 10,520,087 B2
(45) Date of Patent: Dec. 31, 2019

(54) CYLINDER DEVICE

(71) Applicant: SMC CORPORATION, Chiyoda-ku (JP)

(72) Inventors: Mikihito Ishii, Moriya (JP); Hiroshi Kusaka, Toride (JP); Ken Nakajima, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 224 days.

(21) Appl. No.: 15/627,993

(22) Filed: Jun. 20, 2017

(65) Prior Publication Data

US 2017/0363208 A1  Dec. 21, 2017

(30) Foreign Application Priority Data

Jun. 20, 2016  (JP) .................................. 2016-121499

(51) Int. Cl.
*F02F 3/00* (2006.01)
*F16J 10/04* (2006.01)
(Continued)

(52) U.S. Cl.
CPC .................. *F16J 10/04* (2013.01); *F01L 9/02* (2013.01); *F16J 1/16* (2013.01); *F16J 1/24* (2013.01); *F16J 9/08* (2013.01)

(58) Field of Classification Search
CPC ......... B25B 5/062; B25B 5/064; B25B 5/087; F15B 15/063; F01L 2013/0052
(Continued)

(56) References Cited

U.S. PATENT DOCUMENTS 6,902,159 B2 * 6/2005 Sawdon .................. B25B 5/062
269/24
7,290,480 B2 * 11/2007 Rentz ..................... B23Q 3/069
269/27
(Continued)

FOREIGN PATENT DOCUMENTS

CN         1189672 C      2/2005
CN       104937285 A      9/2015
(Continued)

OTHER PUBLICATIONS

Japanese Office Action dated Jan. 8, 2019 in Patent Application No. 2016-121499 (with English translation), 7 pages.
(Continued)

*Primary Examiner* — Long T Tran
*Assistant Examiner* — James J Kim
(74) *Attorney, Agent, or Firm* — Oblon, McClelland, Maier & Neustadt, L.L.P.

(57) ABSTRACT

A cylinder device includes a piston and a piston rod disposed movably, and a movable body in which another end portion of the piston rod is inserted. The piston rod includes a first pin groove that extends along an axial direction and through which a support pin is inserted. The support pin is also inserted through second pin grooves formed in the movable body and having a substantially L-shaped cross section. Further, a link pin is inserted through a pin hole on the other end portion of the piston rod. The link pin is inserted through third pin grooves in the movable body which are inclined at a predetermined angle with respect to the axis of the movable body. In addition, under a moving action of the piston, the movable body is displaced linearly, and thereafter, is rotationally displaced by the link pin moving along the third pin grooves.

5 Claims, 7 Drawing Sheets

(51) Int. Cl.
- *F01L 9/02* (2006.01)
- *F16J 1/16* (2006.01)
- *F16J 1/24* (2006.01)
- *F16J 9/08* (2006.01)

(58) Field of Classification Search
USPC .................. 123/193.4; 269/24, 32; 92/33
See application file for complete search history.

(56) References Cited

U.S. PATENT DOCUMENTS

| | | | | |
|---|---|---|---|---|
| 9,033,324 | B2* | 5/2015 | Chou | B23Q 3/082 |
| | | | | 269/228 |
| 2006/0174760 | A1* | 8/2006 | Rentz | B23Q 3/069 |
| | | | | 92/33 |
| 2012/0292843 | A1* | 11/2012 | Yokota | B25B 5/062 |
| | | | | 269/20 |
| 2015/0345521 | A1* | 12/2015 | Yokota | F15B 15/2807 |
| | | | | 91/435 |

FOREIGN PATENT DOCUMENTS

| | | |
|---|---|---|
| JP | 52-104095 U | 8/1977 |
| JP | 60-123238 A | 7/1985 |
| JP | 5-52304 U | 7/1993 |
| JP | 5-52305 U | 7/1993 |
| JP | 6-53804 U | 7/1994 |
| JP | 2001-295806 A | 10/2001 |
| JP | 2010-106928 A | 5/2010 |

OTHER PUBLICATIONS

Office Action issued in Korean Patent Application No. 10-2017-0077895 with English translation, 6 pages.
"9500 Swing Clamp", posted on Feb. 24, 2015 ( https://www.youtube.com/watch?v=Y4lY9gHgE7A).
Combined Office Action and Search Report dated Dec. 3, 2018 in Chinese Patent Application No. 201710464801.7, 13 pages. (with English translation).
Combined Office Action and Search Report dated Mar. 12, 2019 in Taiwanese Patent Application No. 106120155 (with English translation), 10 pages.

* cited by examiner

CYLINDER DEVICE

CROSS-REFERENCE TO RELATED APPLICATION

This application is based upon and claims the benefit of priority from Japanese Patent Application No. 2016-121499 filed on Jun. 20, 2016, the contents of which are incorporated herein by reference.

BACKGROUND OF THE INVENTION

Field of the Invention

The present invention relates to a cylinder device in which a piston is displaced under a supply action of a pressure fluid, and which is capable of causing a rod to move in both an axial direction and a direction of rotation.

Description of the Related Art

The present applicant, for example, as disclosed in Japanese Laid-Open Utility Model Publication No. 05-052304, Japanese Laid-Open Utility Model Publication No. 05-052305, and Japanese Laid-Open Utility Model Publication No. 06-053804, has proposed a cylinder device used for clamping a workpiece or the like, and which is capable of causing both linear displacement and rotational displacement of a piston rod under a supply action of a pressure fluid.

In such a cylinder device, a piston is disposed movably in the interior of a cylinder tube, a piston rod is connected to the piston, and a portion of the piston rod is made to project out from a rod cover installed on an end portion of the cylinder tube. Together therewith, a guide pin is engaged in a guide groove that is formed on an outer circumferential surface of the piston rod. In the guide groove, a side thereof opposite to the piston is formed in a straight line shape along an axial direction, and the guide groove is formed to turn gradually in a circumferential direction toward the side of the piston.

In addition, when the piston rod moves under the supply of a pressure fluid, under an engagement action between the guide pin and the guide groove, initially the piston rod is displaced in a linear manner, and by reaching a location where the guide groove turns, the piston rod is displaced along the axial direction while undergoing rotation.

SUMMARY OF THE INVENTION

A general object of the present invention is to provide a cylinder device which is capable of reducing a longitudinal dimension when a piston moves in an axial direction, together with conserving an installation space for the cylinder device.

A cylinder device according to the present invention comprises a body having a cylinder chamber in the interior thereof to which a pressure fluid is supplied, a piston disposed movably along an axial direction in the interior of the body, a piston rod connected to the piston, a movable body disposed movably along the interior of the body, with a portion thereof being exposed to the exterior of the body, and which is engaged in an overlapping manner in a radial direction with the piston rod, and a driving force conversion mechanism adapted to switch a direction of movement of the movable body under a moving action of the piston and the piston rod. The driving force conversion mechanism includes a first converting section for moving the movable body along the axial direction, and a second converting section for moving the movable body in a direction of rotation, and the first converting section and the second converting section each function independently of each other.

According to the present invention, in the cylinder device having the piston that is movable along the body under the supply of a pressure fluid, the movable body is provided, which is disposed movably along the interior of the body, and is engaged in an overlapping manner in a radial direction with the piston rod. Under a moving action of the piston and the piston rod, the movable body is moved in the axial direction by the first converting section that constitutes the driving force conversion mechanism, and the direction of movement thereof is switched to a rotational direction by the second converting section. Consequently, accompanying movement of the piston along the axial direction, the movable body undergoes only linear displacement in the axial direction by operation of the first converting section, whereas the movable body undergoes movement only in the rotational direction by operation of the second converting section.

As a result, by configuring the driving force conversion mechanism so that the first converting section and the second converting section function independently of each other, for example, compared with a conventional cylinder device in which a movable body is made to rotate simultaneously while moving in the axial direction, it is possible to reduce the longitudinal dimension at the end position where the piston is moved farthest in the axial direction, together with conserving space of the installation location by suppressing the amount at which the movable body protrudes.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Figure 1:
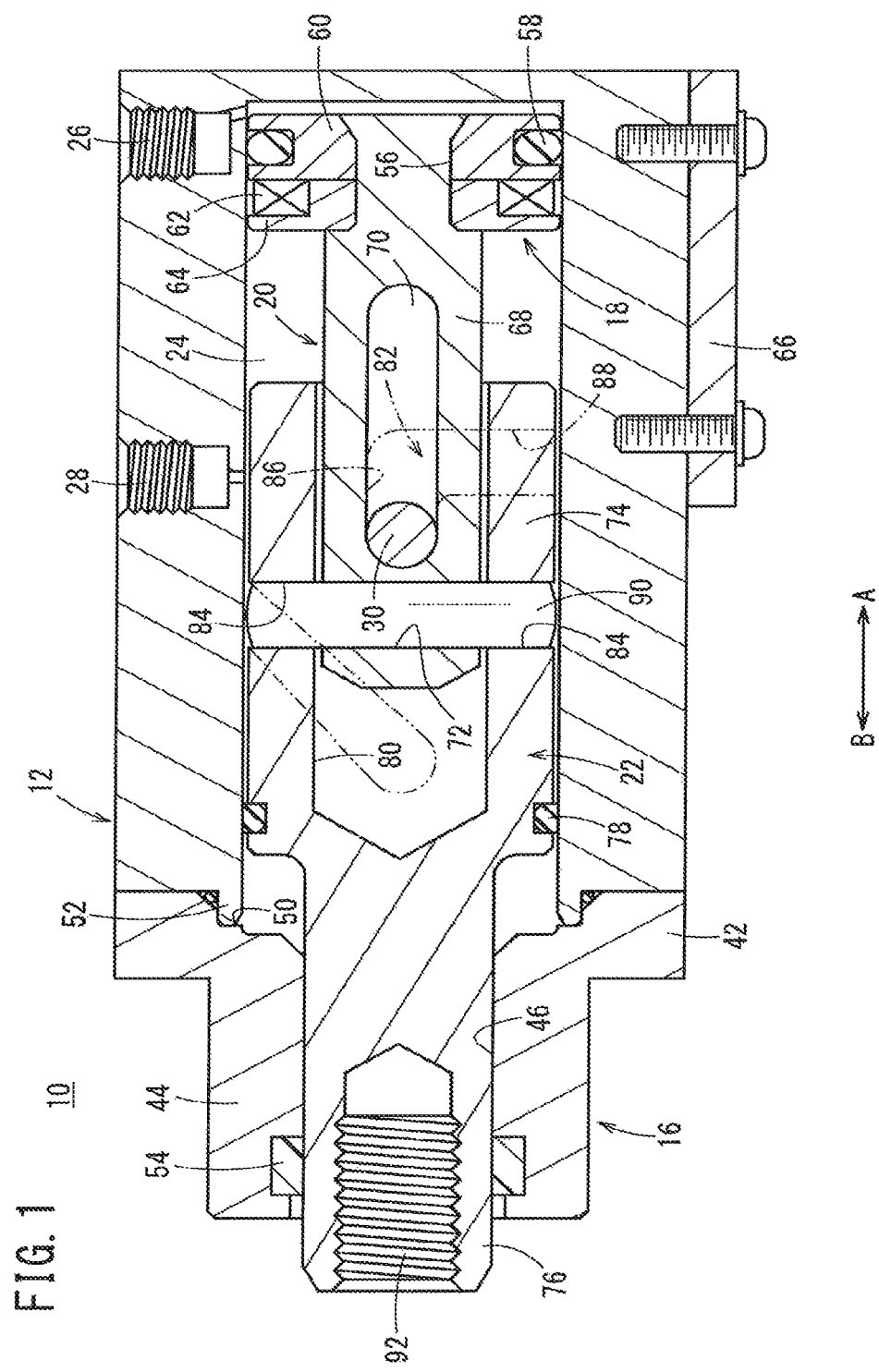
FIG. 1 is an overall cross-sectional view of a cylinder device according to a first embodiment of the present invention.

As shown in FIGS. 1 through 5, the cylinder device 10 includes a cylinder tube (body) 12 with a rectangular cross section and which is closed on one end, a rod cover 16 mounted on another end portion of the cylinder tube 12, a piston 18 disposed movably in the interior of the cylinder tube 12, a piston rod 20 connected to the piston 18, and a movable body 22, which is engaged with the piston rod 20 and is disposed movably along the interior of the cylinder tube 12.

The cylinder tube 12 is made up from a tubular body which is formed from a metal material and extends along the axial direction (the direction of arrows A and B) with a rectangular shape in cross section, and in the interior thereof, a cylinder chamber 24 having a circular shape in cross section is formed in which the piston 18 and the movable body 22 are accommodated.

Further, on an outer circumferential surface of the cylinder tube 12, first and second ports 26, 28 are formed through which a pressure fluid is supplied and discharged. The first port 26 opens in the vicinity of one end portion of the cylinder tube 12, and the second port 28 opens substantially in a center portion along the axial direction (the direction of arrows A and B) of the cylinder tube 12. In addition, the first and second ports 26, 28 communicate respectively with the cylinder chamber 24, and are connected through a non-illustrated tube to a pressure fluid supply source (not shown). Pressure fluid from the pressure fluid supply source is supplied to the cylinder chamber 24 through the first port 26 or the second port 28.

Figure 2:
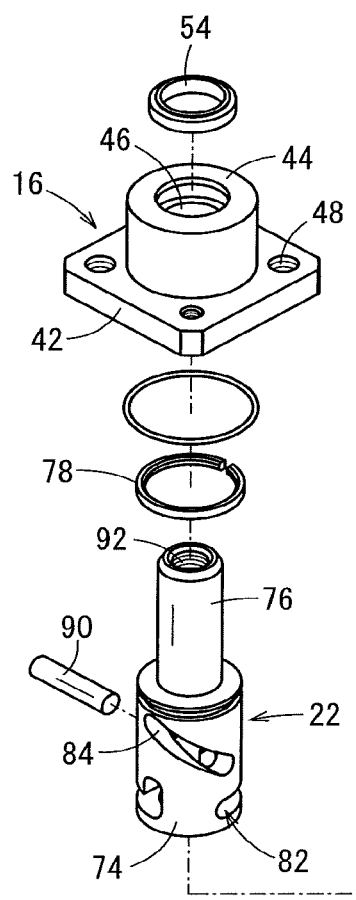
FIG. 2 is an exploded perspective view of the cylinder device of FIG. 1.
Figure 2:
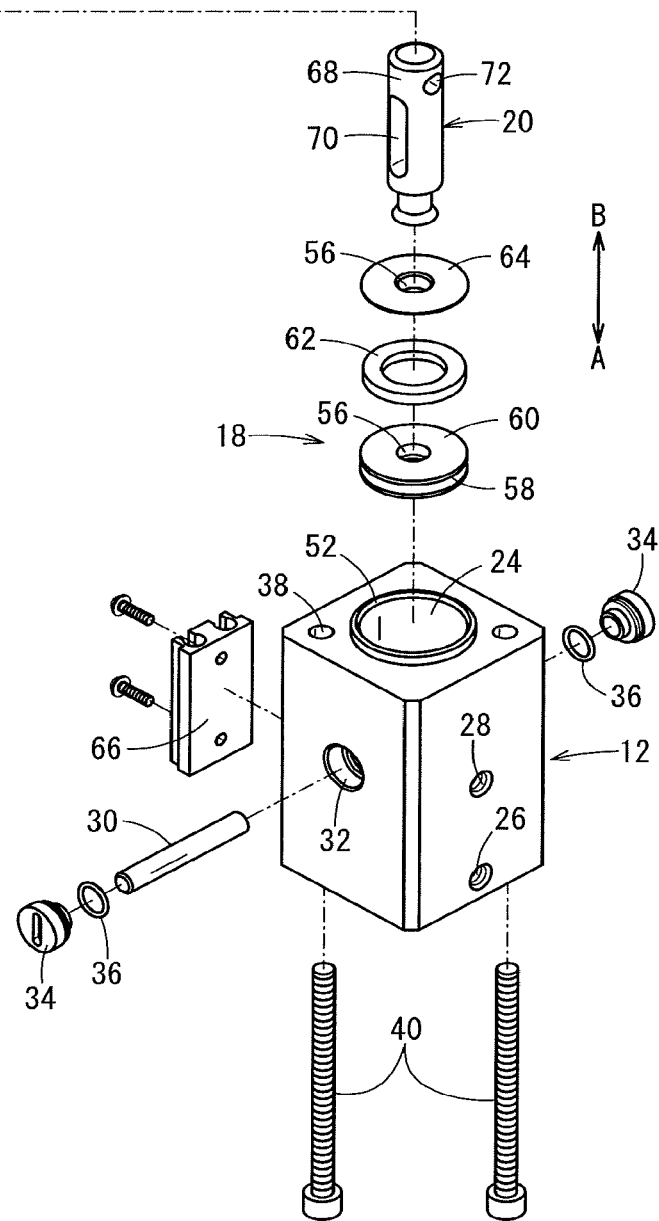
Figure 4:
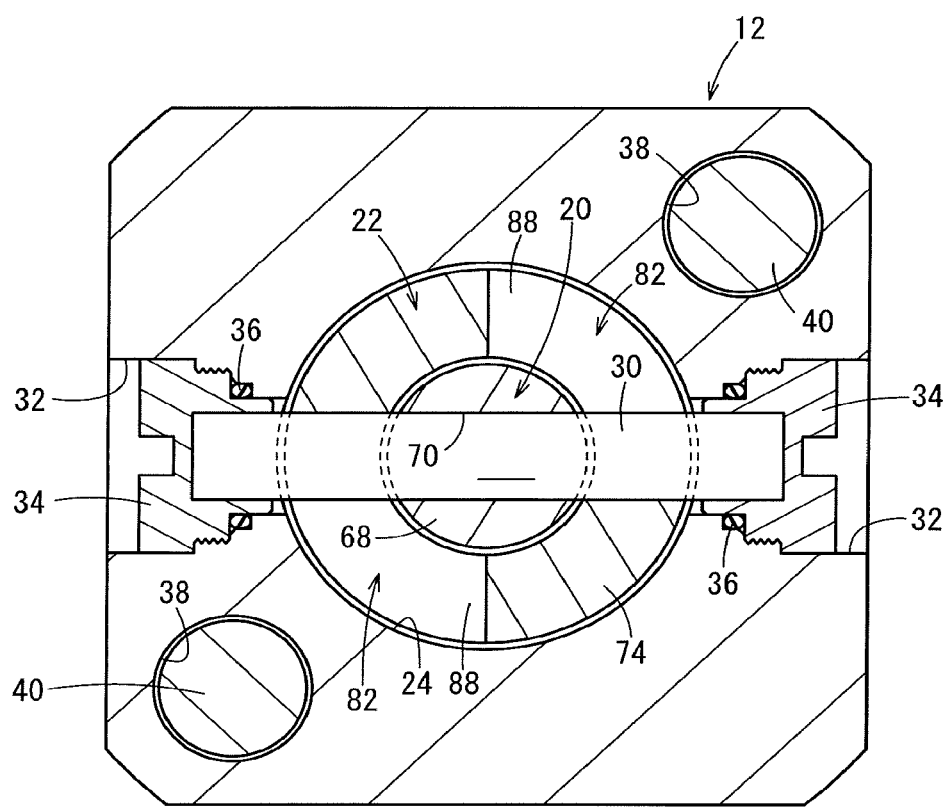
FIG. 4 is a cross-sectional view taken along line IV-IV of FIG. 3.

Furthermore, as shown in FIGS. 2 and 4, a pair of support holes 32, which open on outer circumferential surfaces substantially perpendicular to the first and second ports 26, 28 and in which a support pin (first pin) 30 is inserted, are formed in the cylinder tube 12. The support pin 30 penetrates into the cylinder chamber 24 of the cylinder tube 12, and is disposed perpendicular to the axis of the cylinder tube 12.

In addition, both ends of the support pin 30 are supported respectively in the support holes 32, and the support holes 32 are closed by disk-shaped caps 34. At this time, by mounting of seal rings 36 on outer circumferential surfaces of the caps 34, leakage of pressure fluid between the caps 34 and the support holes 32 is prevented.

On the other hand, on two diagonally opposed corner portions on one end and another end of the cylinder tube 12, penetrating holes 38 are formed that penetrate along the axial direction (the direction of arrows A and B), and a pair of elongate fastening bolts 40 are inserted through the penetrating holes 38. The fastening bolts 40 are disposed such that head portions thereof are located on one end side (in the direction of the arrow A) of the cylinder tube 12.

The rod cover 16 is formed with a T-shape in cross section, and is made up from a flange 42 that is connected to the other end portion of the cylinder tube 12, and a rod retaining part 44 that projects out from the center of the flange 42. A cover hole 46 is formed to penetrate along the axial direction (the direction of arrows A and B) through the center of the flange 42 and the rod retaining part 44.

The flange 42, for example, is formed with a rectangular shape in cross section having the same cross section as that of the cylinder tube 12, and a pair of threaded holes 48 (see FIG. 2) are formed in diagonally opposed corner portions of the flange 42. In addition, in a state in which the flange 42 is placed in abutment with the other end portion of the cylinder tube 12, by screw-engagement of the fastening bolts 40, which have been inserted through the penetrating holes 38 of the cylinder tube 12, into the threaded holes 48, the rod cover 16 including the flange 42 is fixed with respect to the cylinder tube 12.

Further, an annular recess 50, which is recessed toward the side of the rod retaining part 44 (in the direction of the arrow B) at a position on the outer circumferential side of the cover hole 46, is formed in an end surface of the flange 42. In the recess 50, at another end portion of the cylinder tube 12, an annular protrusion 52, which is formed on an outer circumferential side of the opening of the cylinder chamber 24, is inserted into the recess 50 (see FIG. 1). In accordance with this feature, the cylinder tube 12 and the rod cover 16 are connected in a state of being positioned coaxially.

The rod retaining part 44 is formed in a cylindrical shape projecting at a predetermined length with respect to the flange 42, and a rod packing 54 is disposed via an annular groove in the cover hole 46 that is formed in the interior of the rod retaining part 44. In addition, in the cover hole 46, by a later-described rod portion 76 of the movable body 22 being inserted and placed in sliding contact with the rod packing 54, leakage of pressure fluid is prevented, and by the rod portion 76 being placed in sliding contact with the cover hole 46, the rod portion 76 is guided along the axial direction (the direction of arrows A and B).

The piston 18 is constituted from a first plate 60, which is formed in a disk shape having piston holes 56 in the center thereof and retains a piston packing 58, and a second plate 64, which is disposed adjacent to the first plate 60 in the axial direction (the direction of the arrow B) and retains a magnet 62. The piston packing 58 is disposed in an annular groove formed on the outer circumferential surface of the first plate 60, whereas the second plate 64 is arranged on the side of the rod cover 16 (in the direction of the arrow B) with respect to the first plate 60, and the annular magnet 62 is disposed in sandwiching relation between the second plate 64 and the first plate 60.

In addition, the first and second plates 60, 64 are placed in abutment in the axial direction, and in a state in which an end part of the piston rod 20 is inserted through the respective piston holes 56 thereof, the end part is expanded in diameter, whereby the first and second plates 60, 64 and the piston rod 20 are subjected to caulking and connected together.

Further, when the piston 18 moves along the cylinder tube 12, by the piston packing 58 sliding in contact with the inner circumferential surface of the cylinder chamber 24, leakage of pressure fluid between the piston 18 and the cylinder tube 12 is prevented. On the other hand, magnetism of the magnet 62 is detected by a sensor (not shown) which is disposed via a sensor bracket 66 on an outer side of the cylinder tube 12, whereby the position of the piston 18 along the axial direction is identified.

The piston rod 20, for example, is made up from a shaft body having a predetermined length along the axial direction (the direction of arrows A and B), and one end thereof is crimped in a state in which the one end portion is inserted through the piston holes 56 of the piston 18. A first pin groove 70 that extends along the axial direction, and a pin hole 72 through which a later-described link pin (second pin) 90 is inserted are formed in a shaft member 68, which is greater in diameter than the one end portion.

The first pin groove 70 penetrates in a direction perpendicular to the axial direction of the piston rod 20, and is formed with a predetermined length along the shaft member 68. The support pin 30, which is supported by the cylinder tube 12, is inserted through the first pin groove 70. Consequently, by the support pin 30 which is inserted through the first pin groove 70, a state is brought about in which the piston rod 20 is capable of moving only in the axial direction (the direction of arrows A and B) and rotational displacement thereof is restricted.

The pin hole 72 is formed on the other end side (in the direction of the arrow B) of the shaft member 68 with respect to the first pin groove 70, is oriented perpendicularly to the axial direction (the direction of arrows A and B) of the piston rod 20, and penetrates in a direction perpendicular to the penetrating direction of the first pin groove 70. More specifically, the first pin groove 70 and the pin hole 72 are formed in an intersecting manner as viewed from the axial direction of the piston rod 20.

The movable body 22 is made up from a main body portion 74 which is formed, for example, in a cylindrical shape, and a rod portion 76 extending in an axial direction from an end of the main body portion 74. The main body portion 74 is accommodated movably along the cylinder chamber 24, and the rod portion 76 is inserted movably along the cover hole 46 of the rod cover 16. A wear ring 78 is disposed via an annular groove on an outer circumferential surface of the main body portion 74, and slides in contact with the inner circumferential surface of the cylinder chamber 24.

In the center of the main body portion 74, a rod hole 80 is formed that opens on one end and extends along the axial direction. The shaft member 68 of the piston rod 20 is inserted through the interior of the rod hole 80.

On the other hand, on the outer circumferential surface of the main body portion 74, there are formed second pin grooves 82, which are formed on one end side (in the direction of the arrow A) and through which the support pin 30 retained by the cylinder tube 12 is inserted, and third pin grooves (third groove portions) 84, which extend obliquely from a substantially central portion along the axial direction to the side of the other end (in the direction of the arrow B) of the main body portion 74. The second and third pin grooves 82, 84 penetrate in a radial direction from the outer circumferential surface of the main body portion 74 to the rod hole 80, and are provided in respective pairs at positions symmetrical with respect to the axial center of the main body portion 74 (see FIG. 4).

The second pin grooves 82 are each constituted from a first groove portion 86 that extends in the axial direction of the main body portion 74, and a second groove portion 88 that extends along a circumferential direction from one end side (in the direction of the arrow A) of the first groove portion 86. More specifically, the second pin grooves 82 are formed with a substantial L-shape in cross section, with the first groove portions 86 and the second groove portions 88 thereof being roughly perpendicular to each other, and the second groove portions 88 being formed on one end side (in the direction of the arrow A) with respect to the first groove portions 86.

Ends of the third pin grooves 84 are located on one end side (in the direction of the arrow A) of the main body portion 74, and are positioned to face toward an end of the second groove portion 88 in one of the second pin grooves 82. Other ends of the third pin grooves 84 are located on the other end side (in the direction of the arrow B) of the main body portion 74, and are formed at positions on a line of extension of the first groove portion 86 in the other of the second pin grooves 82.

As viewed from the axial direction of the movable body 22 as shown in FIG. 4, the third pin grooves 84 occupy a range of roughly 90° along the circumferential direction, and as viewed from the outer circumferential side of the movable body 22 as shown in FIG. 1, are formed along the circumferential direction so as to be inclined at a predetermined angle with respect to the axis of the main body portion 74.

In addition, in a state in which the shaft member 68 of the piston rod 20 is inserted into the rod hole 80 of the main body portion 74, both ends of the support pin 30, which has been inserted through the first pin groove 70, are inserted respectively through the pair of second pin grooves 82, and both ends of the link pin 90, which has been inserted through the pin hole 72, are inserted respectively through the pair of third pin grooves 84. The link pin 90 is formed in a straight line shape, and is set to a length such that both end portions thereof do not protrude from the outer circumferential surface of the main body portion 74.

The rod portion 76 is in the form of a shaft that projects out from the other end of the main body portion 74, and an attachment hole 92 having threads engraved on an inner circumferential surface opens in an end part of the rod portion 76. The attachment hole 92 is formed so that a non-illustrated clamp arm or the like can be connected thereto. In addition, the rod portion 76 is disposed so that a portion thereof is exposed with respect to the other end of the rod cover 16.

The cylinder device 10 according to the first embodiment of the present invention is constructed basically as described above. Next, operations and advantageous effects of the cylinder device 10 will be described. In the following description, the pulled-in state shown in FIG. 1, in which the piston 18 is moved to the one end side (in the direction of the arrow A) of the cylinder tube 12, and the rod portion 76 of the movable body 22 is retracted and accommodated in the interior of the rod cover 16, will be described as an initial position.

In the initial position, as shown in FIG. 1, the support pin 30 is positioned on the other end side (in the direction of the arrow B) of the first pin groove 70 in the piston rod 20, and further is positioned in the other ends of the first groove portions 86 in the second pin grooves 82 of the movable body 22. Together therewith, the link pin 90 is positioned on the one end side (in the direction of the arrow A) of the third pin grooves 84, and the rod portion 76 of the movable body 22 is accommodated in the interior of the rod cover 16.

In addition, in the above-described initial state, by supplying a pressure fluid to the first port 26 from a non-illustrated pressure fluid supply source, the pressure fluid is introduced into the interior of the cylinder chamber 24, whereupon the piston 18 starts to move integrally together with the piston rod 20 toward the side of the rod cover 16 (in the direction of the arrow B). At this time, the second port 28 is placed in a state of being open to atmosphere.

Because the support pin 30 is inserted through the first pin groove 70, accompanying movement of the piston 18, the piston rod 20 moves only along the axial direction (in the direction of the arrow B) without undergoing rotation. Further, the support pin 30 is inserted into the first groove portions 86 of the second pin grooves 82 that extend along the axial direction, and thus rotational displacement of the movable body 22 also is restricted. Therefore, the movable body 22 moves integrally together with the piston rod 20 in the axial direction (the direction of the arrow B). Consequently, by movement of the rod portion 76 of the movable body 22 along the cover hole 46, the rod portion 76 gradually projects out to the exterior of the rod cover 16.

Figure 3:
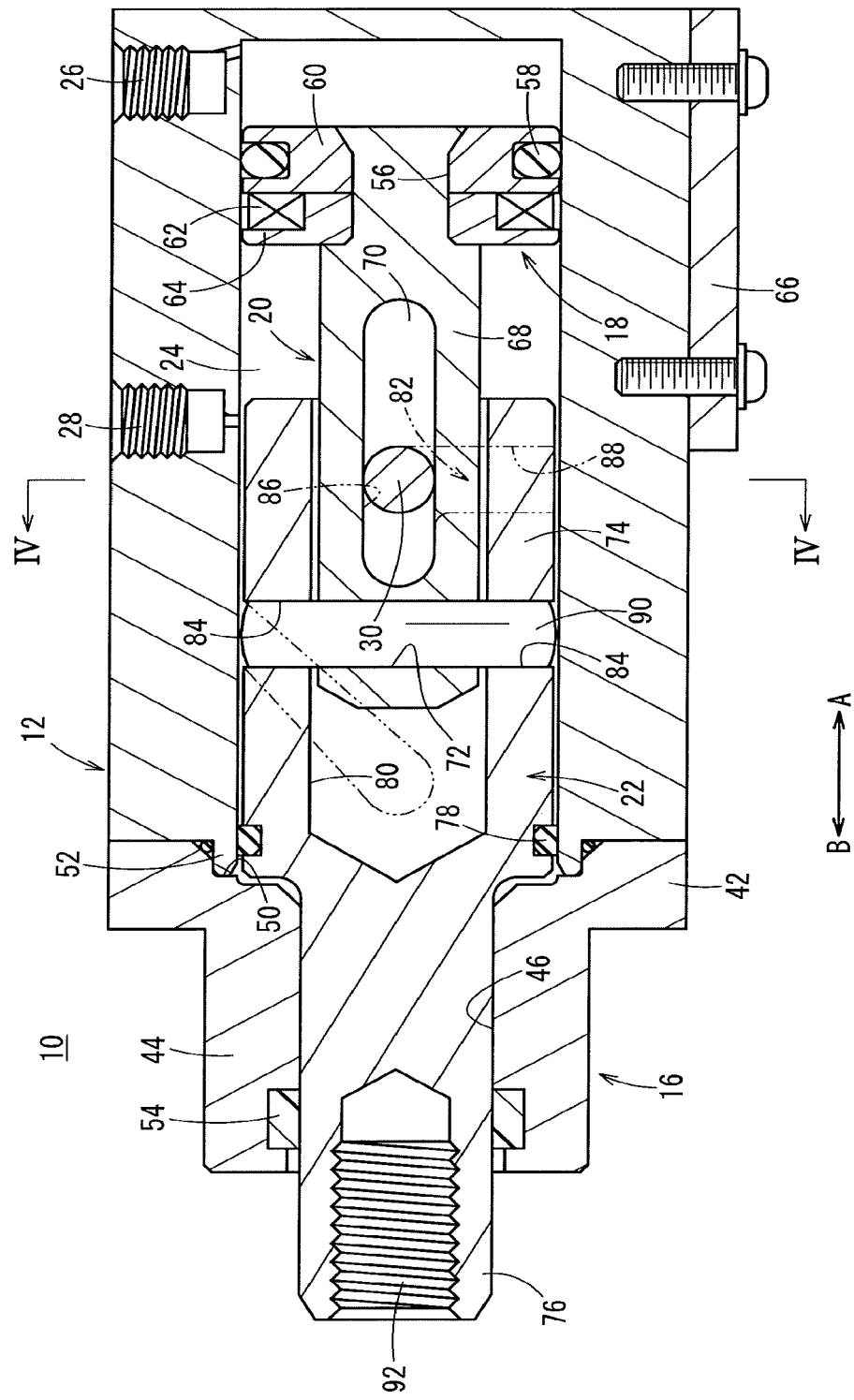
FIG. 3 is an overall cross-sectional view showing a state in which a piston and a movable body of the cylinder device of FIG. 1 are moved to the side of a rod cover, and a support pin is positioned at a boundary site between a first groove portion and a second groove portion.

Next, the movable body 22 undergoes movement accompanying movement of the piston 18 and the piston rod 20, and as shown in FIG. 3, in the second pin grooves 82 thereof, when the support pin 30 arrives at a boundary site (one end of the first groove portions 86) between the first groove portions 86 and the second groove portions 88, further movement of the movable body 22 in the axial direction (the direction of the arrow B) is restricted, and together therewith, by the support pin 30 reaching a position facing toward the second groove portions 88 that extend in the circumferential direction, a state is brought about in which it becomes possible for the movable body 22 to move in a direction of rotation. In this case, the link pin 90 is still in a state of being positioned at one end of the third pin grooves 84. In other words, a state is brought about in which the movement restricted state of the movable body 22 in the rotational direction by the first groove portions 86 is released.

It should be noted that the amount at which the aforementioned movable body 22 moves in the axial direction (the direction of the arrow B) is equal to the length in the axial direction of the first groove portions 86.

Consequently, movement of the movable body 22 in the axial direction (the direction of the arrow B) is ended, and a pushed out state is brought about in which the main body portion 74 comes into proximity to the rod cover 16, and the other end part of the rod portion 76 projects out to the exterior from the rod cover 16.

In addition, by further movement of the piston 18 and the piston rod 20 toward the side of the rod cover 16 (in the direction of the arrow B), the link pin 90 moves to the side of the rod cover 16, and along therewith, simultaneously with the link pin 90 starting to move from the one end to the other end of the third pin grooves 84, the support pin 30 begins to move in a direction away from the first groove portions 86 along the second groove portions 88 of the second pin grooves 82 that extend along the circumferential direction. Consequently, upon movement of the link pin 90, the movable body 22 starts to rotate with respect to the piston rod 20.

Figure 5:
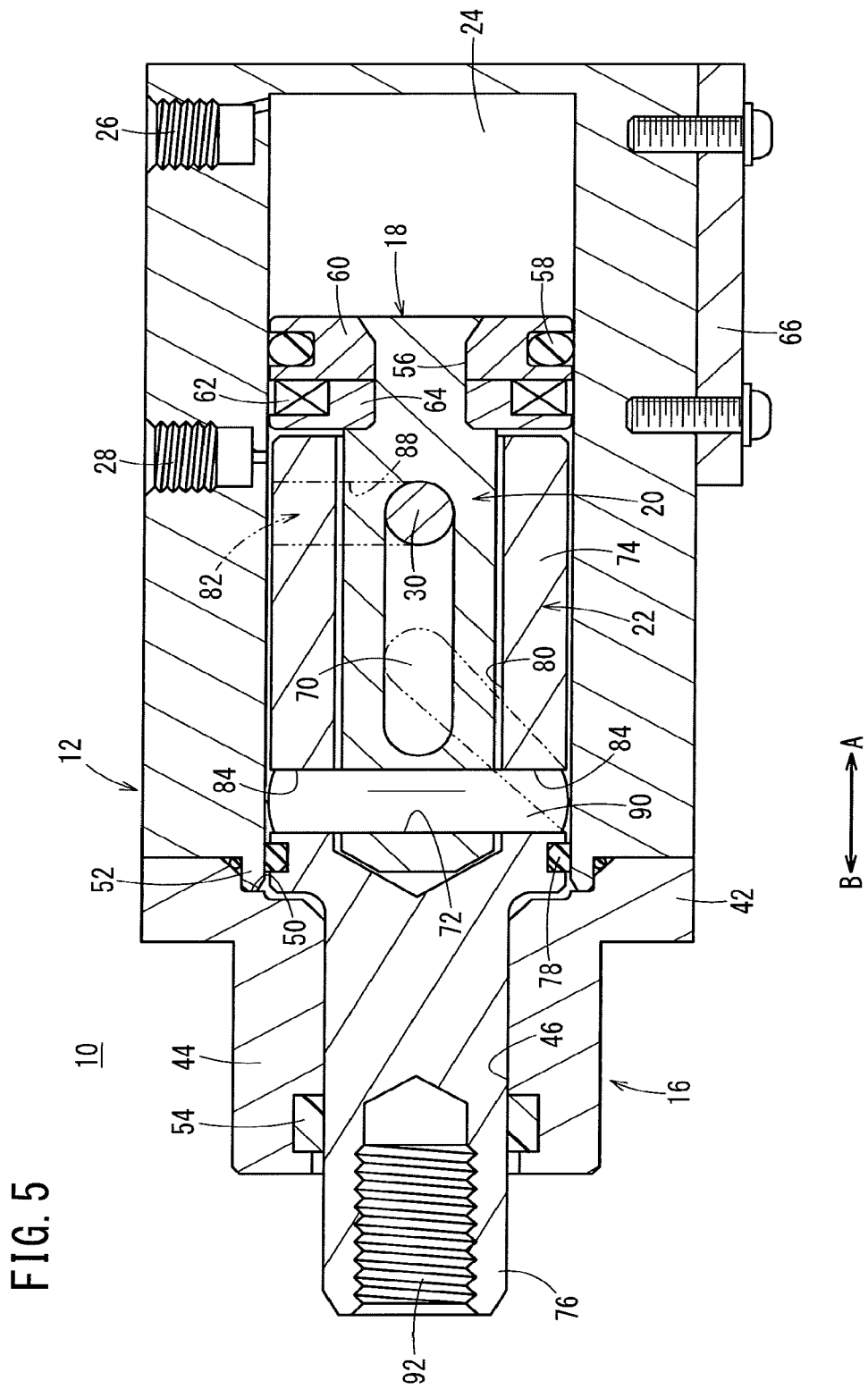
FIG. 5 is an overall cross-sectional view showing an end position in which the piston of the cylinder device of FIG. 3 is displaced further toward the side of the rod cover, and the movable body is rotationally displaced.

As shown in FIG. 5, accompanying movement of the piston 18 and the piston rod 20 along the axial direction (in the direction of the arrow B), the link pin 90 abuts against the other end of the third pin grooves 84, and the movable body 22 rotates roughly 90° along the circumferential direction until the support pin 30 arrives at the end of the second groove portions 88 in the second pin grooves 82, and at the time of reaching the other end, an end position is brought about in which the rotational motion of the movable body 22 is stopped. More specifically, the amount of movement (angle of rotation) of the movable body 22 in the direction of rotation is the distance (angle) along the circumferential direction of the second groove portions 88 of the second pin grooves 82.

At this time, since the support pin 30 is inserted through the second groove portions 88 that extend in a direction perpendicular to the axial direction of the piston rod 20, the movable body 22 assumes a state in which movement thereof in the axial direction (the direction of the arrow B) is restricted, and in the aforementioned pushed-out state, the rod portion 76 is made to undergo only rotational displacement.

In this manner, in the cylinder device 10, by the piston 18 and the piston rod 20 being moved along the axial direction under the supply of a pressure fluid, the movable body 22 is displaced in a straight line by a predetermined distance toward the side of the rod cover 16 (in the direction of the arrow B), and thereafter, undergoes rotational motion by a predetermined angle (roughly 90°) about the piston rod 20. More specifically, the linear movement and rotational movement of the movable body 22 are carried out independently of each other and without being performed simultaneously.

Stated otherwise, the second pin grooves 82 formed in the movable body 22 function as a driving force conversion mechanism, which together with transmission of axial movement towards the axial direction, is capable of converting and transmitting the movement direction of the piston 18 and the piston rod 20 into a direction of rotation.

For example, in the event that a clamp arm is mounted and used on the rod portion 76 of the movable body 22, after the clamp arm has been pushed out by a predetermined distance in the axial direction without being rotated, the clamp arm is rotated together with the movable body 22, whereby the clamp arm can be placed in a preparatory state while retracting in a direction of rotation from a position of facing toward a workpiece.

From the above preparatory state, in the case that a retracting operation is carried out by which the piston 18 is made to move to the one end side (in the direction of the arrow A) of the cylinder tube 12 as shown in FIG. 1, the pressure fluid that was supplied to the first port 26 is supplied instead to the second port 28, whereby the piston 18 and the piston rod 20 move to the one end side (in the direction of the arrow A) of the cylinder tube 12. Accompanying such movement, by being moved to the one end side of the cylinder tube 12, the link pin 90 moves toward the one end side (in the direction of the arrow A) from the other end of the third pin grooves 84, together with the second groove portions 88 of the second pin grooves 82 moving along the support pin 30 and to the side of the first groove portions 86 along the circumferential direction, whereby the movable body 22 is rotationally displaced in an opposite direction by a predetermined angle.

In addition, by the link pin 90 reaching the one end of the third pin grooves 84, and the support pin 30 arriving at the boundary site between the first groove portions 86 and the second groove portions 88 in the second pin grooves 82, rotational displacement of the movable body 22 is stopped. As a result, the clamp arm is positioned in facing relation to a workpiece which has been placed on a workpiece placement unit (not shown). In this case, the movable body 22 is moved only in a direction of rotation without undergoing movement in the axial direction (the direction of the arrow A).

By further movement of the piston 18 and the piston rod 20 toward the one end side of the cylinder tube 12 (in the direction of the arrow A), the movable body 22 is moved in the axial direction along the support pin 30 by the length of the first groove portions 86, with the link pin 90 remaining in a retained state at the one end of the third pin grooves 84. In addition, at a point in time that the support pin 30 has reached the other end of the second groove portions 88, movement of the movable body 22 along the axial direction (in the direction of the arrow A) is stopped, the piston 18 is moved to the one end side of the cylinder tube 12, and the rod portion 76 of the movable body 22 assumes a retracted state of being accommodated in the interior of the rod cover 16.

For example, in the case that the clamp arm is mounted on the rod portion 76 of the movable body 22, by the operation of being pulled-in or retracted, the workpiece is clamped between the clamp arm and the non-illustrated workpiece placement unit. Stated otherwise, when the cylinder device 10 is used to clamp the workpiece, the retracted state serves as a state for clamping the workpiece.

In the foregoing manner, according to the first embodiment, the cylinder device 10 having the piston 18 that is moved under the supply of a pressure fluid includes the movable body 22, in the interior of which the shaft member 68 of the piston rod 20 is inserted, and on the movable body 22, there are formed the second pin grooves 82 in which the support pin 30 is inserted and which switch between movement in the axial direction of the movable body 22 and movement in a direction of rotation, and the third pin grooves 84, in which the link pin 90, which is inserted through the pin hole 72 of the piston rod 20, is inserted, and which restricts the movement amount (angle of rotation) in the direction of rotation of the movable body 22.

In addition, accompanying movement of the piston 18 along the axial direction, the movable body 22 undergoes linear displacement only in the axial direction along the first groove portions 86 of the second pin grooves 82, and by movement from the end of the first groove portions 86 to the second groove portions 88 which extend in the circumferential direction, the movable body 22 can be displaced only in the rotational direction while linear displacement thereof is restricted.

As a result, for example, in the case that a clamp arm for gripping a workpiece is mounted on the end of the movable body 22, since the clamp arm does not undergo rotational displacement until reaching a predetermined position along the axial direction of the cylinder device 10, the cylinder device 10 can be used not only in a space in which the area surrounding the cylinder device 10 is limited, but also in situations in which the clamp arm cannot be moved in the axial direction while being rotated.

Further, with the cylinder device 10, since the linear displacement along the axial direction, and the rotational displacement along the direction of rotation in the movable body 22 are performed separately and independently of each other, the movement amount along the axial direction, and the movement amount (angle of rotation) along the direction of rotation can be set respectively. Therefore, compared to a conventional cylinder device in which rotation takes place while undergoing movement in the axial direction, the amount of movement in the axial direction can be minimized insofar as necessary, and therefore, it is possible to reduce the longitudinal dimension in a pushed-out state in which the movable body 22 projects out maximally from the cylinder tube 12.

Stated otherwise, the longitudinal dimension along the axial direction (the direction of arrows A and B) of the cylinder device 10 can be made compact.

Figure 6:
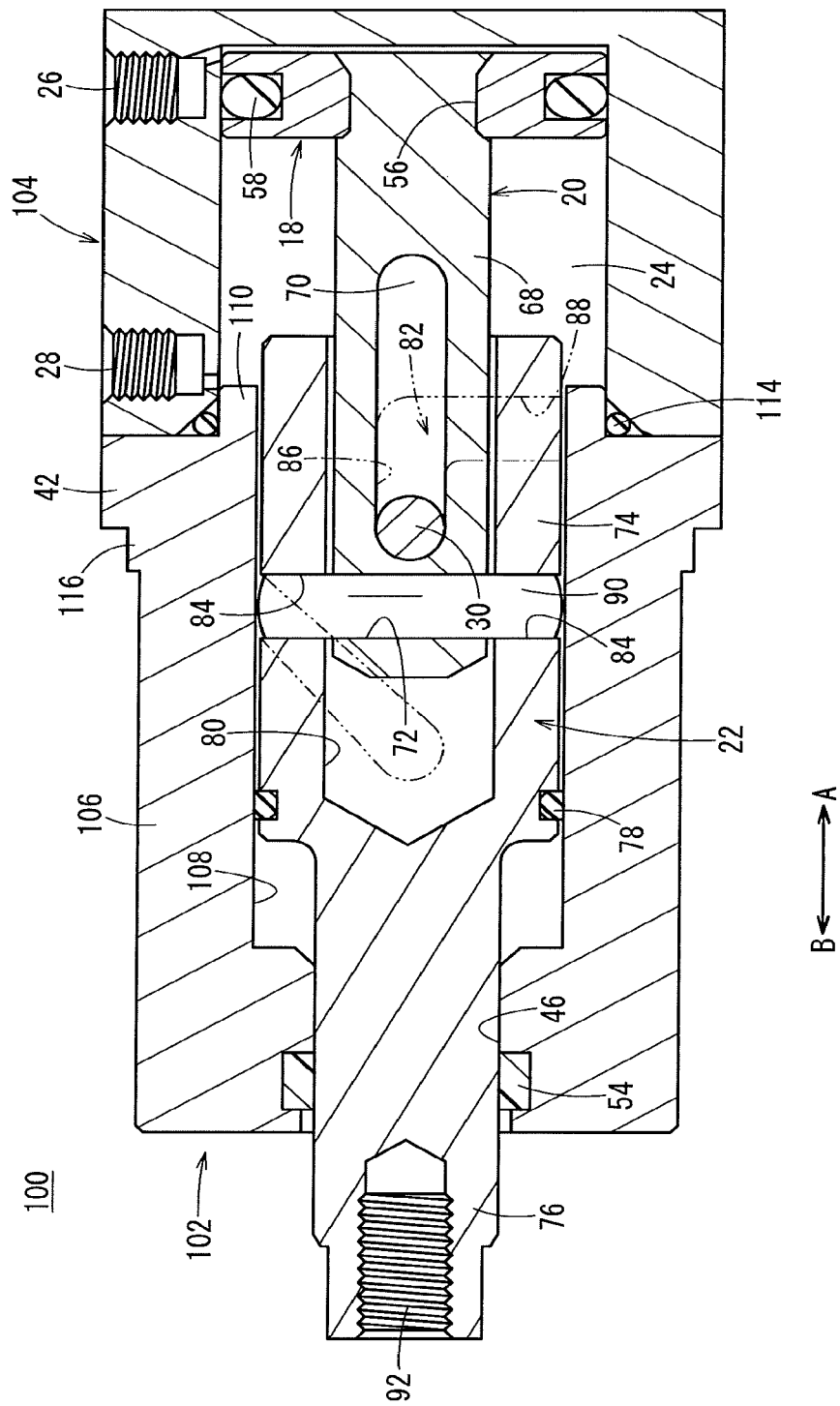
FIG. 6 is an overall cross-sectional view of a cylinder device according to a second embodiment of the present invention.
Figure 7:
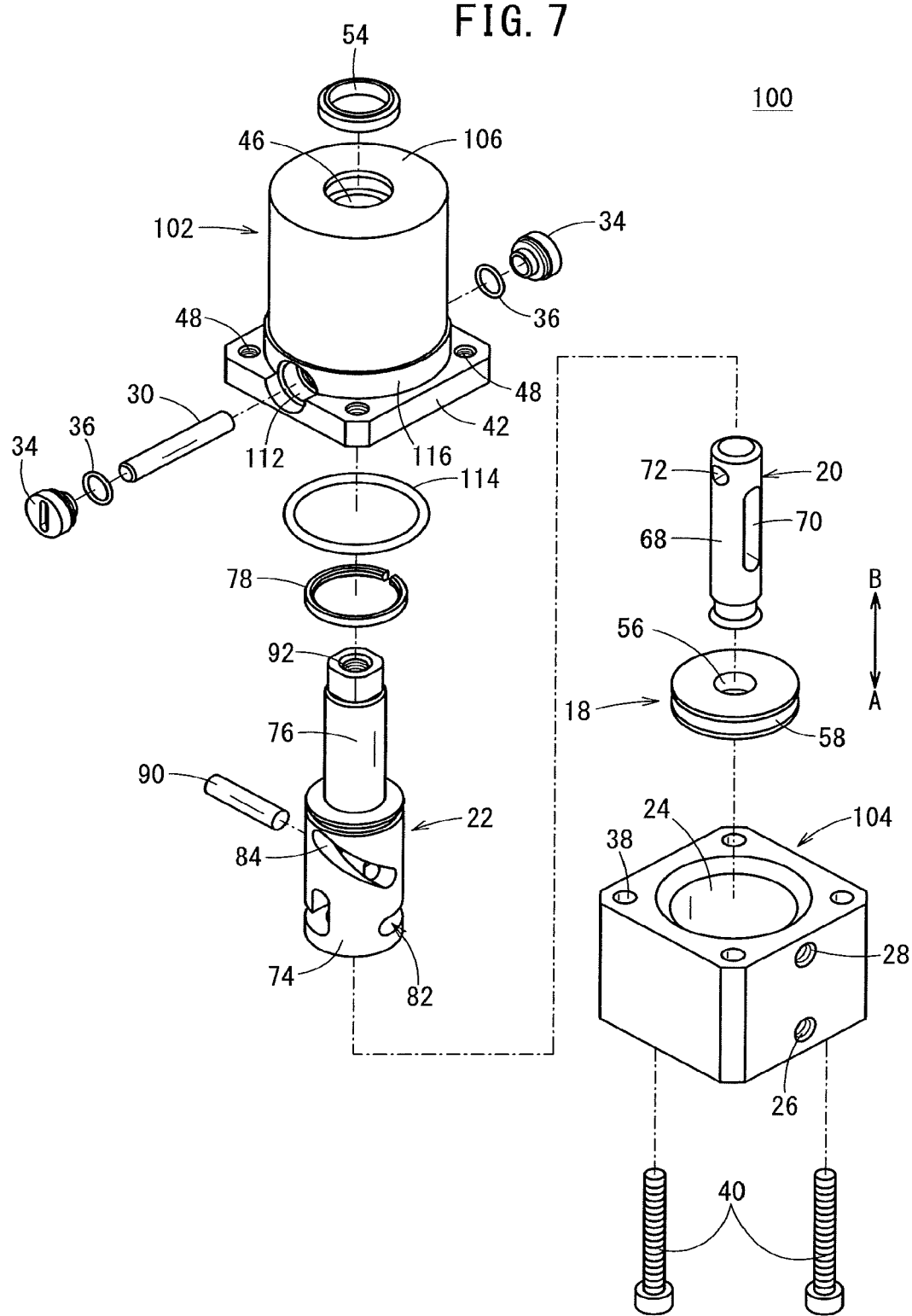
FIG. 7 is an exploded perspective view of the cylinder device of FIG. 6.

Next, a cylinder device 100 according to a second embodiment is shown in FIGS. 6 and 7. Constituent elements thereof, which are the same as those of the cylinder device 10 according to the above-described first embodiment, are denoted with the same reference characters, and detailed description of such features is omitted.

The cylinder device 100 according to the second embodiment differs from the cylinder device 10 according to the first embodiment, in that the cylinder device 100 includes a rod cover 102 in which the main body portion 74 of the movable body 22 can be accommodated, and the length in the axial direction (the direction of arrows A and B) of the cylinder tube 104 is made shorter.

As shown in FIGS. 6 and 7, in the cylinder device 100, first and second ports 26, 28 are formed respectively in the vicinity of both ends of the cylinder tube 104, and on the other end portion thereof, the rod cover 102 is connected through a flange 42 and fixed by a pair of fastening bolts 40.

The rod cover 102 is made up from the flange 42 which is connected to the cylinder tube 104, and a cylindrical movable body retaining member 106 that projects out from the center of the flange 42. An accommodating hole 108 in which the movable body 22 is movably disposed is formed in the center of the flange 42 and the movable body retaining member 106. Further, a cover hole 46 in communication with the accommodating hole 108 is formed in the other end side (in the direction of the arrow B) of the movable body retaining member 106, and the rod portion 76 of the movable body 22 is movably inserted therein.

More specifically, the main body portion 74 of the movable body 22 is accommodated in the accommodating hole 108 of the rod cover 102, and a portion of the movable body 22 also is accommodated in the interior of the cylinder tube 104.

On an end surface of the flange 42, an annular protrusion 110 is formed that projects toward the side of the cylinder tube 104 (in the direction of the arrow A). The protrusion 110 is formed on the outer peripheral side of the accommodating hole 108, and is inserted into the cylinder chamber 24 and fitted therein. In accordance with this feature, via the flange 42, the cylinder tube 104 and the rod cover 102 are connected in a state of being positioned coaxially.

Further, a pair of support holes 112 (see FIG. 7) are formed so as to straddle across the flange 42 and the movable body retaining member 106. A support pin 30 is inserted inside the support holes 112 perpendicularly with respect to the axis of the rod cover 102.

Furthermore, an O-ring 114 is mounted between the flange 42 and the cylinder tube 104, which acts to prevent leakage of pressure fluid from between both members.

Further, a stepped portion 116 is formed adjacent to the flange 42 on the outer circumferential surface of the movable body retaining member 106. The stepped portion 116 is formed in a diametrically outward expanding manner, and is used, for example, as an inlay or mating surface when the cylinder device 100 is inserted and positioned in a hole or opening of a non-illustrated installation site.

Since operations of the cylinder device 100 according to the second embodiment, which is constituted in the manner described above, are the same as those of the cylinder device 10 according to the above-described first embodiment, detailed description of such operations is omitted.

The cylinder device according to the present invention is not limited to the above embodiments, and it is a matter of course that various additional or modified structures could be adopted therein without departing from the essence and gist of the present invention as set forth in the appended claims.

What is claimed is:

1. A cylinder device comprising:
   a body having a cylinder chamber in an interior thereof to which a pressure fluid is supplied;
   a piston disposed movably along an axial direction in the interior of the body;
   a piston rod connected to the piston, wherein the piston rod is provided with an axially extending pin groove and a pin hole, wherein the pin hole is at a circumferential position of the piston rod that is spaced by 90° from the pin groove;
   a first pin supported by the body and inserted in the pin groove to prevent rotation of the piston during movement of the piston along the axial direction;
   a movable body disposed movably along the interior of the body, with one portion thereof being exposed to an exterior of the body, and which is engaged in an overlapping manner in a radial direction with the piston rod;
   a second pin supported by the movable body and inserted in the pin hole; and
   a driving force conversion mechanism adapted to switch a direction of movement of the movable body under a moving action of the piston and the piston rod;

wherein the driving force conversion mechanism includes a first converting section for moving the movable body along the axial direction, and a second converting section for moving the movable body in a direction of rotation, and the first converting section and the second converting section each function independently of each other.

2. The cylinder device according to claim 1, wherein:
the first converting section comprises a first groove portion, which extends along the axial direction of the movable body, and through which the first pin is inserted; and
the second converting section comprises a second groove portion connected to the first groove portion and which extends in a circumferential direction, and a third groove portion that extends obliquely with respect to the axial direction of the movable body, and through which the second pin is inserted.

3. The cylinder device according to claim 2, wherein the second groove portion extends toward the piston with respect to the first groove portion.

4. The cylinder device according to claim 1, wherein the piston is circular in section.

5. The cylinder device according to claim 2, wherein the piston is circular in section.

* * * * *